United States Patent [19]

Meixner et al.

[11] Patent Number: 4,778,770
[45] Date of Patent: Oct. 18, 1988

[54] PROCESS FOR MAKING SENSOR ELEMENTS IN A RETAINING FRAME FOR A PYRODETECTOR

[75] Inventors: Hans Meixner, Haar; Reinhard Freitag, Munich; Felix Pettke, Herzebrock; Hans Siwon, Obing; Ulrich Armonier, Rheda, all of Fed. Rep. of Germany

[73] Assignee: Siemens Aktiengesellschaft, Berlin and Munich, Fed. Rep. of Germany

[21] Appl. No.: 69,025

[22] Filed: Jul. 1, 1987

Related U.S. Application Data

[62] Division of Ser. No. 898,441, Aug. 20, 1987.

[30] Foreign Application Priority Data

Sep. 11, 1985 [DE] Fed. Rep. of Germany ....... 3532454
Jun. 4, 1986 [DE] Fed. Rep. of Germany ..... 36187321

[51] Int. Cl.$^4$ .................. H01L 31/00; H01L 21/52
[52] U.S. Cl. ............................ 437/1; 437/2; 437/3; 437/216
[58] Field of Search ............ 437/1, 2, 3, 570.1, 437/216; 250/338 PY, 342

[56] References Cited

U.S. PATENT DOCUMENTS

| 3,842,276 | 10/1974 | Southgate | 250/336 |
| 4,404,468 | 9/1983 | Kleinschmidt | 250/342 |
| 4,434,549 | 3/1984 | Smith et al. | 437/3 X |
| 4,593,456 | 6/1986 | Cheung | 437/3 |

FOREIGN PATENT DOCUMENTS

| 0023354 | 5/1983 | European Pat. Off. |
| 2930632 | 3/1982 | Fed. Rep. of Germany |
| 3028252 | 3/1982 | Fed. Rep. of Germany |
| 3216664 | 11/1983 | Fed. Rep. of Germany |
| 3230728 | 2/1984 | Fed. Rep. of Germany |

OTHER PUBLICATIONS

Electronics, Jun. 16, 1982, 8032 Electronics International, vol. 55 (1982), No. 12, pp. 84 and 86.

Primary Examiner—George T. Ozaki
Attorney, Agent, or Firm—Hill, Van Santen, Steadman & Simpson

[57] ABSTRACT

A sensor element arrangement for a pyrodetector has a concave mirror with a sensor element arranged at a focus of the concave mirror and further sensor elements arranged laterally therefrom. Electrodes of both polarities are present on each side of the film, these electrodes being respectively separated from one another by quasi-meander-like, metal-free strips which engage into one another in the form of hook portions. The electrodes on the upper side reside opposite corresponding electrodes on the lower side for the formation of the sensor elements, and these electrodes are connected to one another at edge regions by connection lines. The sensor element arrangement together with the film and the connection lines is surrounded by a retaining frame which is insertable into the mounting of the concave mirror in centered and adjusted fashion.

6 Claims, 3 Drawing Sheets

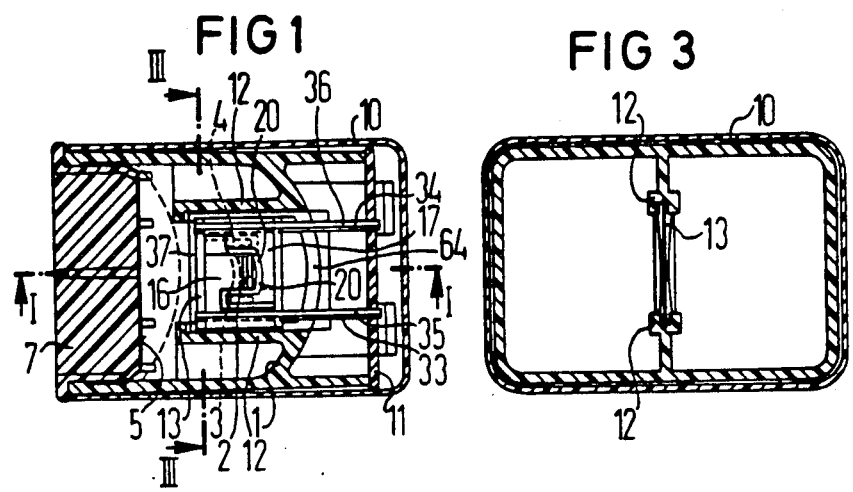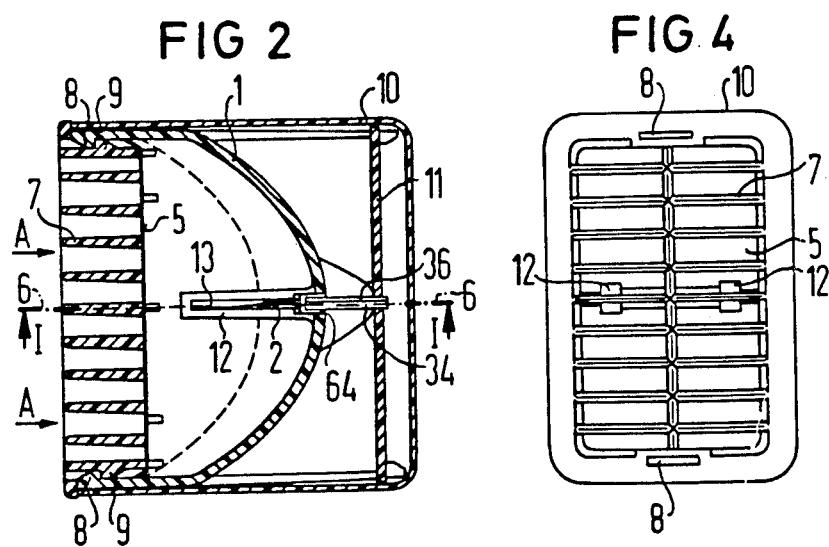

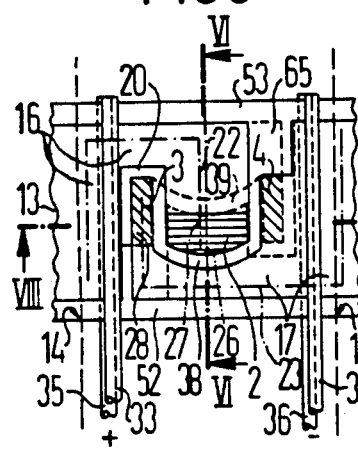
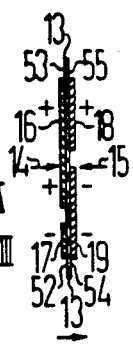
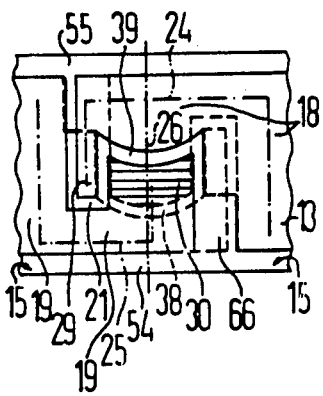
FIG 5  FIG 6  FIG 7
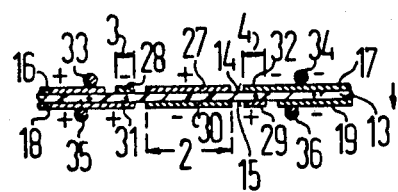
FIG 8

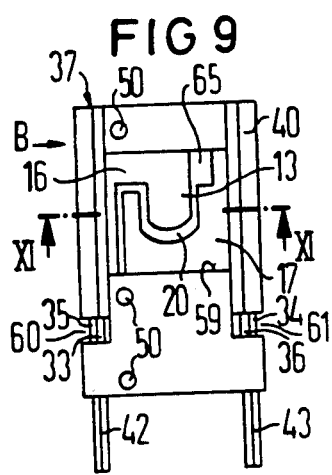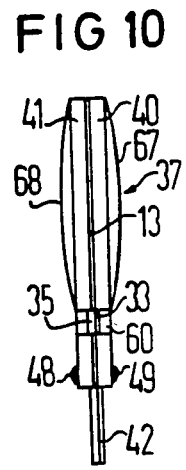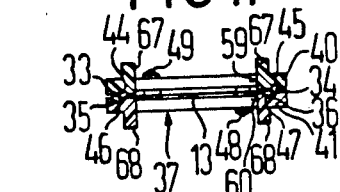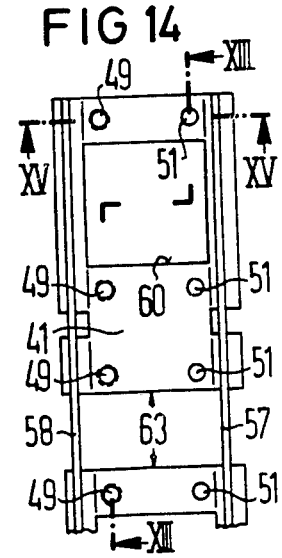

PROCESS FOR MAKING SENSOR ELEMENTS IN A RETAINING FRAME FOR A PYRODETECTOR

This is a division, of application Ser. No. 898,411, filed Aug. 20, 1986.

RELATED APPLICATIONS

The present application is related to the following applications: "PYRODETECTOR FOR THE DETECTION OF A BODY ENTERING INTO ITS DETECTION AREA", Hill U.S. Pat. No. 4,716,294 and "PYRODETECTOR FOR THE DETECTION OF A BODY ENTERING INTO ITS DETECTION AREA", Hill Ser. No. 897,316.

BACKGROUND OF THE INVENTION

The invention relates to a sensor element arrangement in a retaining frame for a pyrodetector which serves for the detection of a body entering into its detection area having a temperature deviating from its ambient temperature. The sensor element arrangement contains a concave mirror for focusing the heat radiation emanating from the body. A first sensor element is provided at the focus of the concave mirror, and two further sensor elements are provided for the compensation of environmental influences. A film of uniform electrically non-conductive material having a permanent isodirectional orientation polarization and with electrodes formed of thin metal layers situated on both sides of the film is provided for the first and for the two further sensor elements. The electrodes are connected to an electronic evaluation means via electrical lines. The sensor element arrangement is secured in a mounting in the concave mirror, and the film with the sensor elements is arranged in the concave mirror such that a radiation incidence of the radiation reflected in the concave mirror is present on both surface sides of the film. The concave mirror is a parabolic mirror dimensioned such that its focus lies in the inner half of the concave mirror. The film with the sensor elements lies on the optical axis of the concave mirror so that the first sensor element is essentially impinged only by radiation of the detectable body situated at a greater distance which has been reflected in the concave mirror.

The invention further relates to a method for the manufacture of a sensor element arrangement in a retaining frame. First the sensor elements are generated by appropriate metallization on a plastic film formed, for example, of polyvinylidene di-fluoride (PVDF). This arrangement is provided with power leads and is subsequently accommodated in a retaining frame.

A pyrodetector having the recited features is disclosed in detail in terms of its structural design and, in particular, in terms of its function, in EP-B No. 1 0 023 354. This European patent corresponds to German Pat. No. 29 30 632 together with German No. OS 30 28 252 and also corresponds to U.S. Pat. No. 4,404,468, incorporated herein by reference. FIGS. 6 and 8 and the corresponding portions of the specification as well as claims in the European patent illustrate and explain embodiments of the sensor element arrangement wherein the permanent orientation polarizations of the plastic film are isodirected for the individual sensor elements. In the embodiment shown in accordance with FIG. 6 therein, however, a common cooperating electrode is shown for two elements, whereas only two sensor elements are shown in the embodiments of FIG. 8 therein.

Although three sensor elements are shown in FIG. 3 of the European patent and are set forth in the specification, these three sensor elements only have respective common electrodes on each side of the plastic film.

The effect of the detector is all the better, the more the heat radiation not to be detected is eliminated from the actual detection event by further sensor elements. This detection event is further intensified when these further sensor elements have a polarization direction opposite that of the sensor element located at the focus. In order to realize this, it can be derived from the European patent to either impress an opposite polarization at the corresponding locations in the plastic film for the sensor elements and to separately connect a respective electrode to the evaluation circuit, or to employ a sensor film which exhibits isodirected orientation polarization over its entire area, and to also individually connect the electrodes to the evaluation circuit in this case as well.

Although these embodiments are fundamentally possible and have likewise been realized in laboratory models, it has nonetheless been found that the fabrication-oriented expense for manufacturing such pyrodetectors is extremely high, so that considerable costs arise which do not yield a rational selling price, particularly because mass production can hardly be realized.

SUMMARY OF THE INVENTION

An object of the present invention is to specify a sensor element arrangement for a pyrodetector of the type initially cited which, given low fabrication expense, mainly enables a mass production with extremely high piece numbers and yields a pyrodetector having even more exact detection. Included in the object of the invention is to specify a method for the manufacture of such a sensor element arrangement with a retaining frame.

In order to achieve this object, the sensor element arrangement in a retaining frame of the invention has the following features:

electrodes of both polarities are present on each side of the film;

the electrodes are separated from one another on each side by a metal-free insulating strip which proceeds in quasi-meander-like fashion;

the configuration of the electrodes is fashioned such that they interengage in the form of hook portions;

the electrodes at the upper side are opposite the electrodes at the lower side of the film such that the three sensor elements are formed, the end portions or faces of the hook portions of the electrodes present in the center of the film forming the anti-polar coatings of the sensor element intended for the positioning at the focus, and end portions or end faces deviating from the center of the film forming the antipolar coatings of the two sensor elements serving for compensation, together with opposite electrode surfaces;

the respective isopolar electrodes of the two sides which lie opposite one another at the edge regions of the film are connected to one another by connection lines outside of the film; and the sensor element arrangement together with the film and connecting lines is surrounded by a retaining frame which can be inserted into the mounting in centered and adjusted fashion.

The electrodes are preferably formed of aluminum, zinc, tin, copper, silver or gold, or of one of the metals of the platinum group, and are produced in a vapor-deposition method.

When the electrodes are formed of copper or silver layers, then it is advantageous for improving the absorption, or for reducing the reflection of the radiation to be detected (infrared radiation), that the surfaces of the layers are converted into the respective sulfide (CuS or $Ag_2S$). For this purpose, electrodes of the other metal, but also of copper or silver, can be provided with a plastic layer which, for example, is formed of polyimide, polyethylene, polyethyleneteraphthalate or zapon varnish. Thus, there is simultaneous protection against influences from the environment as well.

The area of the middle sensor element provided at the focus of the concave mirror is preferably adapted to the focus region itself. It is also advantageous that, for a concave mirror arced in two planes whose curvature in one plane can be greater than in the other plane, the area of the middle sensor element is limited toward the edge region by straight parts of the metal-free strips proceeding in quasi-meander-like fashion, and are limited at right angles by curved parts of the metal-free strips proceeding in quasi-meander-like fashion.

These embodiments are advantageous because, except for the detection direction, the pyrodetector must be a structure that is closed toward the outside and thus has a space which is shielded from disturbing influences. When a concave mirror arced in only one plane is selected, i.e. a concave mirror whose cross-section always follows the same parabola over its entire width, then the focus area is a region along the center axis and parallel to the mirror surface which expands the actual focal line. The further sensor elements would then have to be arranged preceding or following this focus area in the incident direction of the heat radiation, and the lateral parts would have to be closed perpendicular to the mirror plane.

In a significantly more favorable embodiment, a concave mirror is provided which is arced in two planes which are perpendicular to one another and for which it is recommended to select one axis longer than the other. Thus, the curvature in one plane is preferably greater than in the other plane. Given such a concave mirror, the focus area is sickle-shaped or moon-shaped and does not extend up to the lateral housing parts. This embodiment provides that the area of the middle sensor element provided for positioning in the focus of the concave mirror is adapted to the focus mirror. As a result, it is possible to arrange the further sensor elements at both sides of the focus area in the incident direction of the heat radiation, whereby further fabrication-oriented advantages and an accurate detector result.

Since electrodes of both polarities which interengage in the fashion of the invention are present on each side of the sensor film, the possibility results of connecting the electrodes of the same polarity at opposite sides to one another outside of the film, and to incorporate the entire sensor element arrangement together with film and lines in a retaining frame which is inserted in centered fashion and which is adjusted in the mounting inside the concave mirror.

A sensor element arrangement is thus provided in a retaining frame which carries the film of the sensor elements and has electrical lines as power leads to the sensor elements and plug pins for connection to the electronic evaluation circuit. In combination therewith, the retaining frame is formed of an upper part and a lower part of pressed or molded insulating material. These parts are connected to one another, and between them the film as well as the electrical lines are secured. These lines merge into the plug pins.

The two parts of the retaining frame contain the lines in channels. The respective channels of the upper part are offset by a slight amount in comparison to the channels of the lower part, and thus hold the film and clamping contacts between the lines and the metal layers of the electrodes.

It is a further advantage when the upper part and the lower part of the retaining frame are provided at respectively identical locations with pegs and holes at identical locations respectively corresponding for the connection of the two parts, based on the push-button principle.

All of these features make it possible for the upper retaining frame and the lower retaining frame to be identical to one another in plan view and in cross section. When the frame is assembled, the two parts of the retaining frame can then be joined to one another without further effort.

The following steps are provided for the manufacture of a sensor element arrangement with retaining frame of the invention:

(a) A band metallized on both sides and formed of a film of polyvinylidine di-fluoride provided with metal on both sides is manufactured. The film is vapor-coated, and metal straight edge strips are left at both sides in a longitudinal direction of the band. At the same time or subsequent thereto, metal-free strips proceeding in quasi-meander-like fashion are produced on the upper side and strips proceeding in quasi-meander-like fashion are produced on the underside of the band. They always repeat such that the desired configuration of the electrodes arises for the sensor elements.

(b) The retaining frame is manufactured such that before, synchronously with, or in a different chronological execution relative to method step (a), at least one conductor-like structure formed of two wires from supply reels are formed. At these wires or separately, retaining frame parts comprising the channels are produced. Pegs and holes are formed. The wires are secured in the channels as lines. A spacing respectively corresponding to the length of the plug pins required is observed between the retaining frame parts which are identical in plan view and in cross section.

(c) The retaining frame parts are separated from the linelike structure or structures before or after the interposition of a corresponding part of the band of method step (a) so as to form the film with the electrodes and the sensor elements. They are interposed at right angles relative to the running direction of the conductor-like structure. The push-button connection is then actuated.

The band of method step (a) is preferably metallized in a silk-screening method, whereby the quasi-meander-like strips are produced by corresponding cover stencils.

It is particularly advantageous to metallize the band of method steps a) by vapor-deposition or by cathode-atomization with one of the metals aluminum, zinc, tin, copper, silver or gold, or one of the metals of the platinum group, and to produce the quasi-meander-like strips by electro-erosion (for example with a rolling wheel acting as an electrode), by chemical etching, laser energy, or in a mechanical way by grinding.

Given electrodes of copper or silver layers, to convert the surface thereof into the respective sulfide (CuS, Ag$_2$S), it is advantageous according to a further method step following the manufacture of the electrodes, that the film provided with the electrodes of copper or silver is passed through a vessel in which hydrogen sulfide (H$_2$S) is situated as a gas or as hydrogen sulfide water. An adequate chemical conversion at the surface of the layers occurs merely by means of this treatment.

The particular nature of the arrangement of the electrodes for the individual sensor elements on the plastic film proposed by the present invention, together with the retaining frame, enables the connection of electrodes of identical polarity on the upper and lower side of the sensor film in accordance with the invention. It also enables a sensor element arrangement with retaining frame for a pyrodetector which can be manufactured in an especially economical way and is therefore suitable for mass production.

BRIEF DESCRIPTION OF THE DRAWINGS

FIG. 1 illustrates a pyrodetector with a built-in sensor element arrangement in accordance with section line I—I in FIG. 2;

FIG. 2 shows the pyrodetector of FIG. 1 in accordance with section line II—II in FIG. 1;

FIG. 3 is a sectional view along the line III—III in FIG. 1;

FIG. 4 is a plan view of the pyrodetector from the direction of the arrows A in FIG. 2;

FIG. 5 is a plan view of a sensor element arrangement without the retaining frame;

FIG. 6 is a sectional view through the sensor element arrangement along line VI—VI in FIG. 5;

FIG. 7 is a plan view of the underside of the sensor element arrangement of FIG. 5;

FIG. 8 is a sectional view through the arrangement along the line VIII—VIII in FIG. 5;

FIG. 9 illustrates in plan view the complete sensor element arrangement with inserted sensor element film, retaining frame, and lines in a plan view;

FIG. 10 shows the sensor element arrangement of FIG. 9 in a side view in accordance with arrow B in FIG. 9;

FIG. 11 is a sectional view along the line XI—XI in FIG. 9;

FIG. 12 is a part of a conductor-like structure formed of a frame and associated electrical lines;

FIG. 13 is a sectional view along the line XIII—XIII in FIG. 14;

FIG. 14 illustrates a part of the conductor-like structure of FIG. 12 seen from the backside; and FIG. 15 is a sectional view along the line XVI-XVI in FIG. 14.

DESCRIPTION OF THE PREFERRED EMBODIMENTS

FIG. 1 shows the pyrodetector as a section along the line I—I in FIG. 2. The parabolic concave mirror 1 which is opened toward the left in the drawing is accommodated in the housing 10 which also serves the purpose of shielding. The opening is closed with a honeycomb lattice 7 and with a cover film 5 stretched over this lattice. The function and design of the honeycomb lattice are set forth in detail in the initially cited European Patent. The same is true of the cover film 5 for which a further embodiment is additionally set forth in the German Patent Application P No. 35 32 475.9 (filed Sept. 11, 1985).

The compact design and structure of the overall pyrodetector is set forth in the German Patent Application P No. 35 32 476.7 (filed Sept. 11, 1985).

It proceeds from FIGS. 1 and 2 that a mounting 12 formed of two parts is arranged in the central portion of the concave mirror 1. The concave mirror 1 also has a further opening 64 in its center opposite the opening directed toward the left, the two parts of the mounting 12 proceeding from this further opening 64. As may be seen from FIG. 3, these parts of the mounting 12 are U-shaped in cross-section.

The sensor element arrangement, together with the retaining frame 37 carrying it, is inserted into this mounting. Visible in FIG. 1 is the film 13 with the sensor elements 2, 3 and 4 situated thereon. The sensor element 2 is arranged in the focus of the concave mirror 1. The sensor elements 3 and 4 are arranged at both sides of the sensor elements 2 at right angles to the direction of the incident heat radiation. Also visible in FIG. 1 are the connection lines 33, 34, 35, and 36 which, as shall be set forth in detail later, connect the individual electrodes of the upper and under side of the film 13 to one another, and which serve as plug pins for connection to the electronic evaluation means 11. The thickness of the film 13 depends on the desired response time (entry of the body into the detection area until emission of a signal), and preferably is about 10 m.

This electronic evaluation means 11 is set forth, first, in the afore-mentioned European Patent Application and, second, is set forth in the German Patent Application P No. 35 32 476.7 which relates to the overall structural design of the pyrodetector. The electronic evaluation means 11 is formed of a printed circuit board with printed interconnects and active and passive components attached thereto. It serves the purpose of generating a signal corresponding to the respective detection situation, this signal being capable of being exploited for the actuation of, for example, a switch event.

It proceeds from FIG. 2 that the honeycomb lattice 7 is secured in the concave mirror by barbs 8 situated at the concave mirror 1, and barbs 9 situated at the honeycomb lattice 7. The line I—I in FIG. 2 simultaneously represents the optical axis 6 of the concave mirror. The sensor element 2 is situated both in the optical axis 6 of the concave mirror 1 as well as in its focus, which in turn arises in the inner half of the concave mirror due to the structural design of the concave mirror.

FIG. 4 shows a plan view of a pyrodetector in accordance with the arrows A in FIG. 2, whereby the honeycomb lattice, the cover 5, the two parts of the mount 12, and the barbs 8 can again be seen.

FIG. 5 shows the sensor element without retaining frame in a view onto the upper side 14; FIG. 6 shows a section along the line VI—VI in FIG. 5; and FIG. 7 shows the sensor element arrangement in a view onto the underside 15. FIG. 8 represents a sectional view along the line VIII—VIII in FIG. 5.

FIGS. 5, 6, 7 and 8 shall be described below.

Metal layers as electrodes 16 and 17 are applied to the upper side 14 of the film 13, these electrodes 16 and 17 being separated from one another by a metal-free insulating strip 20 proceeding in quasi-meander-like fashion. The electrodes 16 and 17 engage into one another through these parting strips in the form of hook portions 22 and 23. A corresponding arrangement of metal layers as electrodes 18 and 19 is contained on the bottom side 15 of the film 13, these being separated from one another by the metal-free insulating strips 21 which proceed in quasi-meander-like fashion. The electrodes 18 and 19 engage into one another in the form of hook portions 24 and 25. The hook-like path of the electrodes is indicated by dash-dot-dash lines.

The end portions or end faces 27 and 30 of the hook portions 22 and 25 of both sides of the film 13 reside opposite one another, and thus form the antipolar coatings of the sensor element 2, this being shown by obliquely proceeding hatching lines.

Together with electrode surfaces 31 and 32 lying opposite them, the end portions or end faces 28 and 29 of the hook portions 23 and 24 form the sensor elements 3 and 4 shown with slanted lines in FIG. 2, and which are situated at both sides of the sensor element 2. The size of the coating surfaces of the sensor elements 3 and 4 lying opposite one another can be enlarged since the respective meander branch is lengthened and/or the metal-free areas 65, 66 at the end of the respectively other meander branch are reduced in size.

At the same time, the line VI—VI also represents the middle 26 of the film 13.

Metal-free edge strips 52, 53, 54, 55 are further present on the upper side 14 and on the under side 15 of the film 13, so that an adequately large insulating path between the electrodes of the upper side 14 and of the underside 15 is present in this region.

At the edge regions of the film 13, the isopolar electrodes 16 and 18 (plus) and 17 and 19 (minus) of the two sides 14 and 15 respectively lying opposite one another are connected to one another by lines 33 and 35 or 34 and 36. They are connected to one another since these lines are in contact with one another outside the film 13.

The polarities in FIGS. 6 and 8 are identified by appropriate symbols (plus and minus). It may be seen in FIG. 6 that plus and minus therein reside opposite one another in only one region, the middle sensor element 2 being thereby formed. FIG. 8 shows that the three sensor elements are present due to the electrode configuration.

The arrows in the film 13 in FIG. 8 indicate the permanent, isodirectional orientation polarization of the film. In the region of the sensor element 2, the positive coating is situated at the top and the negative coating is situated at the bottom, whereas the positive and negative coatings reside opposite one another in reverse direction at both sides of the sensor element 2 in the region of the sensor elements 3 and 4.

It can be clearly seen that, despite a plurality of sensor elements and isodirectional orientation polarization in the film 13, the desired effect, namely, a difference formation of the individual signals in order to avoid heat radiation which is not to be detected, is achieved in a simple way by the opposite poling.

Last but not least, it proceeds from FIGS. 5 and 7 that the area of the middle sensor elements 2 provided for the position in the focus of the concave mirror 1 is adapted to the focus area. For the structural design of the pyrodetector shown here as a preferred exemplary embodiment in FIGS. 1–4, the middle sensor element 2 is limited toward the edge regions where the lines 33 and 35 or 34 and 36 are located, by straight parts of the metal-free strips 20 and 21, and at right angles thereto by corresponding curved parts 38 and 39 of the metal-free strips 20 and 21.

In the embodiment of the pyrodetector shown in FIGS. 14, the concave mirror 1 has a dynamically balanced reflection surface. However, it can also be curved in two planes, namely relative to the plane established by the line I—I (like FIG. 1) and the plane established by the line II—II (like FIG. 2). Thus, the curvature (corresponding to a parabola) relative to the plane established by line I—I is greater than the curvature relative to the plane established by line II—II, whereby the latter curvature need not correspond to a parabola.

In order not to interfere with clarity, the sulfide layers on the copper or silver layers which may be present at the surface of the electrodes 16, 17, 18 and 19 have not been shown in FIGS. 5–8, and particularly FIGS. 6 and 8. Plastic layers which may also be present are not illustrated for the same reason.

The particular configuration of the electrodes on both sides 14 and 15 of the film 13 is practically only effective when a retaining frame specifically designed therefor is present, this being included in the invention and set forth below with reference to FIGS. 9–15.

FIG. 9 shows the complete retaining frame 37 in a plan view of its upper part 40.

FIG. 10 shows that the retaining frame 37 is formed of an upper part 40 and of a lower part 41, whereby both parts 40 and 41 of the retaining frame 37 are, in particular pressed or molded of insulating material. The two parts 40 and 41 are connected to one another, and both the film 13 as well as the lines 33, 34, 35, 36 are secured between them. The latter merge into plug pins 42 and 43 outside of the frame.

The plastic film 13 with the electrodes 16 and 17, and the metal-free strip 20 proceeding in quasi-meander-like fashion may be seen in the window 59 (FIG. 9) of the retaining frame 37.

FIG. 11 shows that the upper part 40 is provided with channels 44 and 45 in the edge region of the retaining frame 37 and the lower part 41 is provided with channels 46 and 47 in the edge region of the retaining frame 30. The lines 33 and 34 or 35 and 36 are inserted into these channels such that they do not lie completely in the channels, but project somewhat above them (see, for example, as well, FIG. 15). The channels 44 and 45 of the upper part 40 are laterally offset by a slight amount in comparison to the channels 46 and 47 of the lower part 41. In the assembled condition of the frame 37, the film 13 is thus shifted out of its plane by a slight amount, so that an intimate pressure contact between the lines 33 and 34 from above and 35 and 36 from below and the metal coatings 16 and 18 at the left side or 17 and 19 at the right side, is produced.

Of course, it is also possible that printed interconnects can also be employed as lines 33, 34, 35, and 36. These interconnects, for example, are soldered to the respective electrodes. The contacting between the electrodes of the film 13 and the wire-like lines 33 can also occur by soldering, as long as the pyro-electrical properties of the film 13 are not deteriorated.

For assembly, the upper part 40 and the lower part 41 of the retaining frame 37 comprise pegs 48 or 49 at respective identical locations and, corresponding thereto, holes 50 or 51 for connecting the two parts 40 and 41 based on the push-button principle are present at respectively identical locations. The pegs 48 and 49 and the holes 50 and 51 are manufactured at the same time as the manufacture of the frame parts 40 and 41.

The openings 60 at the left and 61 at the right shown in FIG. 9 are not absolutely necessary; however, they can serve the purpose of locking the retaining frame 37 in the mount 12 of the concave mirror 1.

FIGS. 10 and 11 furthermore show that the upper part 40 and the lower part 41 of the retaining frame 37 are provided with arc-like shoulders 67 and 68 which facilitate the introduction into the mounting 12 through the opening 64 in the concave mirror 1 and are intended to secure the centering.

The method for manufacturing a sensor element arrangement of the invention is set forth with reference to FIGS. 12-15.

FIG. 12 shows a portion of a conductor-like structure 56 which, in the present case, is formed of the upper parts 40 of the retaining frame and wires 57 and 58. The wires 57 and 58 preferably run off from supply reels and are provided with the parts of the retaining frame. For example, these parts are directly formed at the wires since the two wires 57 and 58 are conducted through a corresponding molding apparatus. However, it is also possible and preferable to manufacture each of the retaining frame parts 40 and 41 separately, and to then subsequently connect them to the wires 57 and 58.

A spacing 63, which roughly corresponds to the length of the plug pins 42 and 43, is provided between two respective retaining frame parts.

Two conductor-like structures can be formed, first with the upper part 40, and second with the lower parts 41. These two conductor-like structures can then be brought together. However, it is also possible to manufacture only one conductor-like structure 56 of retaining frame parts 40 and 41 and the associated wires since the two parts are completely identical in the plan view and in cross-section. After the separation of a respective retaining frame part from the conductor-like structure 56, the frame part is connected to the next part to be separated. It is connected thereto after the interposition of the sensor film 13, for which purpose one of the two retaining frame parts is to be turned around. As a result thereof, pegs 48 and 49, and holes 50 and 51 fit precisely to one another.

For simplifying the illustration of the method, we shall proceed on the basis of manufacturing two conductor-like structures. FIG. 12 shows the conductor-like structure 56 with the upper parts 40, and FIG. 14 shows the conductor-like structure with the lower part 41 of the retaining frame. Both the pegs 48 and 49, as well as the allocated holes 50 and 51 and the windows 59 and 60, are shown in FIGS. 12, 13, and 14.

FIG. 15 shows a section along the line XV—XV in FIG. 14, and again shows the channels 46 and 47 in the lower part 41. It also shows the peg 49 and the hole 51, as well as the wires 58 and 57 situated in the channels 46 and 47. These wires 57 and 58 project out of the channels 46 and 57 by a slight amount for the purpose set forth above.

The sensor element films are manufactured synchronously with or at some other point in time in the manufacture of the conductor-like structures of the frame parts. They are manufactured such that a film, preferably of polyvinyidine difluoride (PVDF) is provided with metal at both sides. It is vapor-deposited therewith, and metal-free edge strips 52, 53, 54, 55 are left free at both sides in the longitudinal direction of the band. At the same time, or subsequently, the metal-free strips proceeding in quasi-meander-like fashion on the upper side 14, and the metal-free strips 21 proceeding in quasi-meander-like fashion on the lower side 15 of the band, are manufactured in constant repetition such that the desired configuration of the electrodes 16, 17, 18, and 19 for the formation of the sensor elements 2, 3, 4 arises.

Before or after the parting of the individual frame parts from the conductor-like structure 56, individual films 14 are separated from the band and are inserted between two respective frame parts, namely at right angles to the running direction of the conductor-like structure. By actuating the push-button connection, the two parts 40 and 41 of the semiconductor frame 37 are firmly connected to one another.

Although various minor changes and modifications might be proposed by those skilled in the art, it will be understood that we wish to include within the claims of the patent warranted hereon all such changes and modifications as reasonably come within our contribution to the art.

We claim as our invention:

1. A method for manufacture of a sensor element assembly wherein sensor elements are provided on a plastic film formed of polyvinylidine difluoride (PVDF) so as to form a sensor arrangement, said sensor arrangement being accommodated in a retaining frame, comprising steps of:

providing a plastic film formed of polyvinylidine difluoride (PVDF) as a band and providing metal at both sides of the plastic film band while leaving metal-free edge strips at both sides along a longitudinal direction of said band, providing metal-free strips which run in quasi-meander-like fashion on first and second sides of the band in a pattern and configuration desired for forming electrodes for a first sensor element and two further sensor elements, and cutting the band into individual films each having the first and two further sensor elements;

manufacturing said retaining frame by providing two wires running off from supply reels and by providing first and second frame parts having channels, pegs, and holes for receiving the pegs, securing said wires in the channels to serve as connection lines from the sensor electrodes to an evaluation means, and providing a plurality of at least the first frame parts secured along the wires with spacings therebetween corresponding to a desired length of the wires such that when after they are cut, plug pins of an appropriate length are provided; and separating the first frame parts from one another by cutting the two wires at the length desired for the plug pins, placing the film with sensor elements thereon between the first and second frame parts and retaining them together by push-button connection.

2. A method according to claim 1 including the steps of metallizing said band in a silk-screening process and thus generating said quasi-meander-like strips.

3. A method according to claim 1 including the steps of metallizing said band by one of the processes selected from the group consisting of vapor-deposition or by cathode sputtering of one of the metals selected from the group consisting of aluminum, zinc, tin, copper, silver, gold, or one of the metals of the platinum group, and generating said quasi-meander-like strips by one of the processes selected from the group consisting of electro-erosion, chemical etching, laser energy, or mechanical grinding.

4. A method according to claim 1 wherein after producing said band with the electrodes thereon, providing the electrodes as one of the elements copper or silver and passing the film through a vessel having hydrogen sulfide H$_2$S therein and converting a surface of said copper or silver layers into a respective sulfide CuS or Ag$_2$S.

5. A method according to claim 1 including the step of securing both the first and second frame parts to the two wires running off from the supply reels.

6. A method for manufacture of a sensor element assembly, comprising steps of:

providing a band of plastic film and providing metal at both sides of the plastic film;

providing metal-free strips which run in quasi-meander-like fashion on first and second sides of the band in a repeating pattern and configuration along the band so as to form a repeating pattern of electrodes for a first sensor element and two further sensor elements;

dividing the band into individual films each having the first and two further sensor elements thereon;

manufacturing a retaining frame for receiving the individual films by providing two wires running off from a supply source, by providing a plurality of first and second frame parts, and by mounting a plurality of said first frame parts in repeating fashion along the two wires;

placing the individual films into the first frame parts;

securing said second frame parts to the first frame parts; and cutting the two wires between the first frame parts so as to provide a plurality of sensor element assemblies.

* * * * *